(12) United States Patent
Tateishi et al.

(10) Patent No.: US 8,381,199 B2
(45) Date of Patent: Feb. 19, 2013

(54) MODULAR AND/OR DEMAND-DRIVEN STRING ANALYSIS OF A COMPUTER PROGRAM

(75) Inventors: Takaaki Tateishi, Kanagawa-ken (JP); Omer Tripp, Herzelyia (IL); Marco Pistoia, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 12/907,974

(22) Filed: Oct. 19, 2010

(65) Prior Publication Data

US 2012/0096440 A1 Apr. 19, 2012

(51) Int. Cl.
*G06F 9/44* (2006.01)
*G06F 9/45* (2006.01)

(52) U.S. Cl. ........ 717/140; 717/141; 717/151; 717/154; 717/124; 717/126

(58) Field of Classification Search .................. None
See application file for complete search history.

(56) References Cited

U.S. PATENT DOCUMENTS

| | | | | |
|---|---|---|---|---|
| 6,072,950 | A * | 6/2000 | Steensgaard | 717/126 |
| 7,089,542 | B2 * | 8/2006 | Brand et al. | 717/143 |
| 2004/0003382 | A1 * | 1/2004 | Steensgaard | 717/154 |
| 2007/0240137 | A1 * | 10/2007 | Archambault et al. | 717/140 |
| 2009/0119654 | A1 * | 5/2009 | Kawahito et al. | 717/141 |
| 2010/0043048 | A1 * | 2/2010 | Dolby et al. | 726/1 |
| 2010/0070955 | A1 * | 3/2010 | Kahlon | 717/141 |

FOREIGN PATENT DOCUMENTS

JP 2009155705 6/2009

OTHER PUBLICATIONS

Geay et al., "Modular String-Sensitive Permission Analysis with Demand-Driven Precision," IEEE, ICSE'09, May 16-24, 2009.*
Christensen et al., "Precise Analysis of String Expressions," Springer-Verlag Berlin Heidelberg 2003.*
Chatterjee et al., "Modular Concrete Type-inference for Statically Typed Object-oriented Programming Languages," CiteSeerx,1997.*
Wu et al., "Modular Monadic Slicing in the Presence of Pointers," Springer-Verlag Berlin Heidelberg 2006.*
Zheng et al., "Demand-Driven Alias Analysis for C," ACM, 2008.*
Jensen et al., "Automatic Verification of Pointer Programs using Monadic Second-Order Logic," ACM, 1997.*
A. Moller et al., "The pointer assertion logic engine," Procs. of ACM SIGPLAN 2001, year 2001.

(Continued)

*Primary Examiner* — Insun Kang
(74) *Attorney, Agent, or Firm* — Vazken Alexanian

(57) ABSTRACT

Modular and/or demand-driven string analysis of a computer program is performed. Each method of the program is encoded into monadic second-order logic (M2L) to yield a set of predicate declarations and a set of constraints. The two sets for each method are composed to yield a union set of predicate declarations and a union set of constraints for the program. The union set of constraints includes a particular set of constraints corresponding to call relationships among the methods. An M2L formula including a free variable corresponding to a program variable is added to the union set of constraints. The two union sets are processed to verify a satisfiability of the constraints in relation to an illegal pattern. Where the constraints are satisfiable, the program can generate a string containing the illegal pattern. Where the constraints are not satisfiable, the program never generates a string containing the illegal pattern.

20 Claims, 7 Drawing Sheets

OTHER PUBLICATIONS

A.S. Christensen et al., "Precise analysis of string expressions," SAS 2003, LNCS 2694, year 2003.

G. Wassermann et al., "Sound and precise analysis of web applications for injection vulnerabilities," Procs. of PLDI, San Diego, Calif., year 2007.

J. Engelfriet et al., "MSO definable string transductions and two-way finite state transducers," Journal of ACM Transactions on Computational Logic (TOCL), year 2001.

Y. Minamide, "Static approximation of dynamically generated web pages," Procs. of WWW, Chiba, Japan, year 2005.

N. Klarlund et al., "MONA version 1.4 user manual," Basic Research in Computer Science, University of Aarhus, Jan. 2001.

F. Yu et al., "String analysis," available at http://citeseerx.ist.psu.edu/viewdoc/summary?doi=10.1.1.84.3591, year 2008.

B.K. Rosen et al., "Global value numbers and redundant computations," Procs of 15th ACM SIGACT-SIGPLAN Symposium on Principles of Programming Languages, Jan. 1988.

R. Cytron et al., "Efficiently computing static single assignment form and the control dependence graph," ACM Transactions on Programming Languages and Systems, year 1991.

* cited by examiner

FIG 1

-- PRIOR ART --

```
String main(String v1) {
  String r;
  if (v1.contains("<")) {
    String v2 = delTag(v1);
    r = v2;
  } else {
    r = v1;
  }
  return r;
}
String delTag(String v3) {
  String v4 = v3.replaceAll("<","x");
  return v4;
}
```
100

FIG 2

```
prog_v1(S) = true
prog_v1then(S) = prog_v1(S) & contains(S, "<")
prog_v1else(S) = prog_v1(S) & notContains(S, "<")
prog_v2(S) = prog_v4(S)
prog_r(S) = prog_v2(S) | prog_v1else(S)

prog_v3(S) = prog_v1then(S)
prog_v4(S) = [|replaceAll|](S, prog_v3,"<","x")
```
200

FIG 3

(Assignment) x=v
    The value v is assigned to program variable x.
(Function call) x = f(x_1, ..., x_n)
    The result of invoking function f with parameters x_1, ..., and x_n is assigned to program variable x. f is either a built-in function or a user-defined function.
(Phi function) x = phi(b_1:x_1, \ldots, b_n:x_n)
    When an immediate predecessor of the current basic block is b_i, program-variable x is assigned the value of x_i. Basic-block numbers are omitted for brevity when possible.
(Conditional jump) jump x, b
    The program jumps to the basic block numbered b if the value of x is true.
(Goto) goto b
    The program jumps to the basic block numbered b.
(Return) return x
    The value of the program variable x is returned.

(Position variable)    $p \in \text{Var1}$
(Position-set variable)    $P \in \text{Var2}$
(Position term)    $t ::= p \mid t+i \mid t-i \mid \$ \mid 0$
(Position-set term)    $T ::= \emptyset \mid \{t,\ldots,t\} \mid \text{all} \mid P \mid T \cup T \mid T \cap T$
    $\mid T \setminus T \mid T^{-1}$
(Formula)    $\phi ::= \text{`}a\text{'}(t)$
    $\mid t=t \mid t<t \mid t \leq t$
    $\mid T=T \mid T \subset T \mid T \subseteq T \mid t \in T$
    $\mid \neg\phi \mid \phi \wedge \phi \mid \phi \vee \phi \mid \phi \Rightarrow \phi \mid \phi \Leftrightarrow \phi$
    $\mid \exists p.\phi \mid \forall p.\phi \mid \exists P.\phi \mid \forall P.\phi$

$$\text{``}a_1 \cdots a_n\text{''}(P) \equiv \exists t_1, \cdots, t_n .$$
$$\text{`}a_1\text{'}(t_1) \wedge \cdots \wedge \text{`}a_n\text{'}(t_n)$$
$$\wedge\, t_1 < t_2 \wedge t_2 < t_3$$
$$\wedge \cdots \wedge t_{n-1} < t_n$$
$$\wedge\, P = \{t_1, \cdots t_n\}$$
$$\text{concat}(R, P, Q) \equiv R = P \cup Q$$
$$\wedge (\forall p, q\, .\, p \in P \wedge q \in Q \Rightarrow p < q)$$
$$\text{strr}(R, P, p, q) \equiv p \leq q \wedge R \subseteq P$$
$$\wedge (\forall r\, .\, r \in P$$
$$\Rightarrow (r \in R \Leftrightarrow p \leq r \wedge r < q))$$
$$\text{substrr}(R, P, p, q) \equiv \exists p', q'\, .\, p \leq p' \wedge p' \leq q' \wedge q' \leq q$$
$$\wedge \text{strr}(R, P, p', q')$$
$$\text{substr}(R, P) \equiv \text{substrr}(R, P, \min(P), \max(P)+1)$$
$$\text{consecutive}(p, q, R) \equiv p < q \wedge p \in R \wedge q \in R$$
$$\wedge (\forall r\, .\, p < r \wedge r < q \Rightarrow r \notin R)$$

500

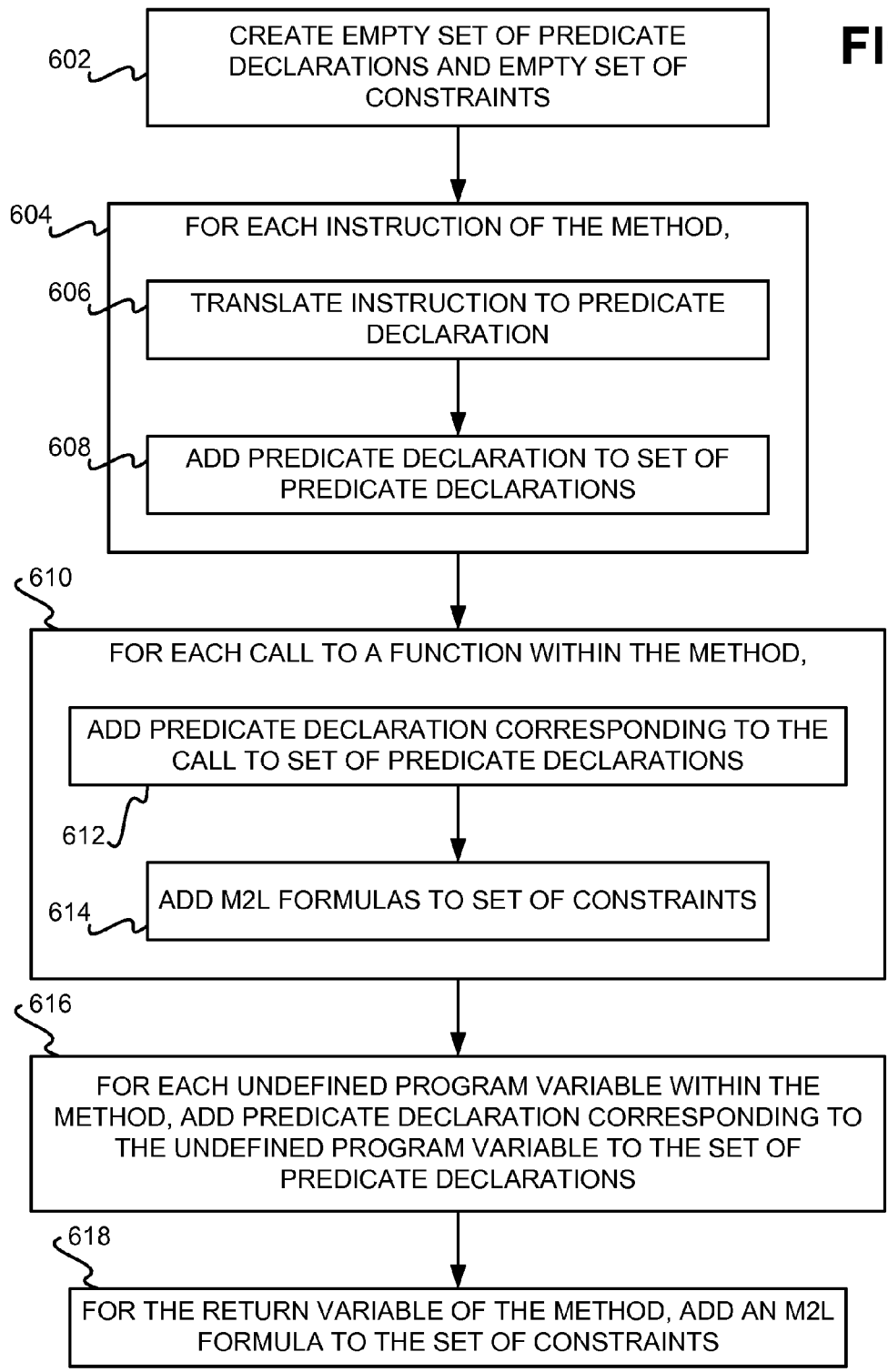

[[F]](FV) = ex2 P: min(FV) in P & max(FV) + 1 in P &
all1 r, rr: consecutive(r,rr,P)
 => ex2 Q, S: ex1 q: strr(Q,FV,r,rr) &
  F(S) & SEP(q) & concat(Q, S, {q});

[FV](S) = ex2 P: min(FV) in P & max(FV) + 1 in P &
(all1 r, rr: consecutive(r,rr,P)
 => ex2 Q: strr(Q,FV,r,rr) & SEP(max(Q)) & (all1 q: q in Q \ {max(Q)} => ~SEP(q)))
& (ex1 r, rr: ex2 Q: consecutive(r,rr,P) & strr(Q,FV,r,rr) & S = Q \ {max(Q)})

FOR EACH TIME THE CALLER METHOD CALLS THE CALLEE METHOD,

904 / 906

ADD A (FIRST) M2L FORMULA TO THE PARTICULAR SET OF CONSTRAINTS, EQUATING A FREE VARIABLE OF THE CALLER METHOD TO A FREE VARIABLE OF THE CALLEE METHOD

ADD A (SECOND) M2L FORMULA TO THE PARTICULAR SET OF CONSTRAINTS, EQUATING A FREE VARIABLE CORRESPONDING TO THE TIME THE CALLER METHOD CALLS THE CALLEE METHOD TO A RETURN VARIABLE OF THE CALLEE METHOD

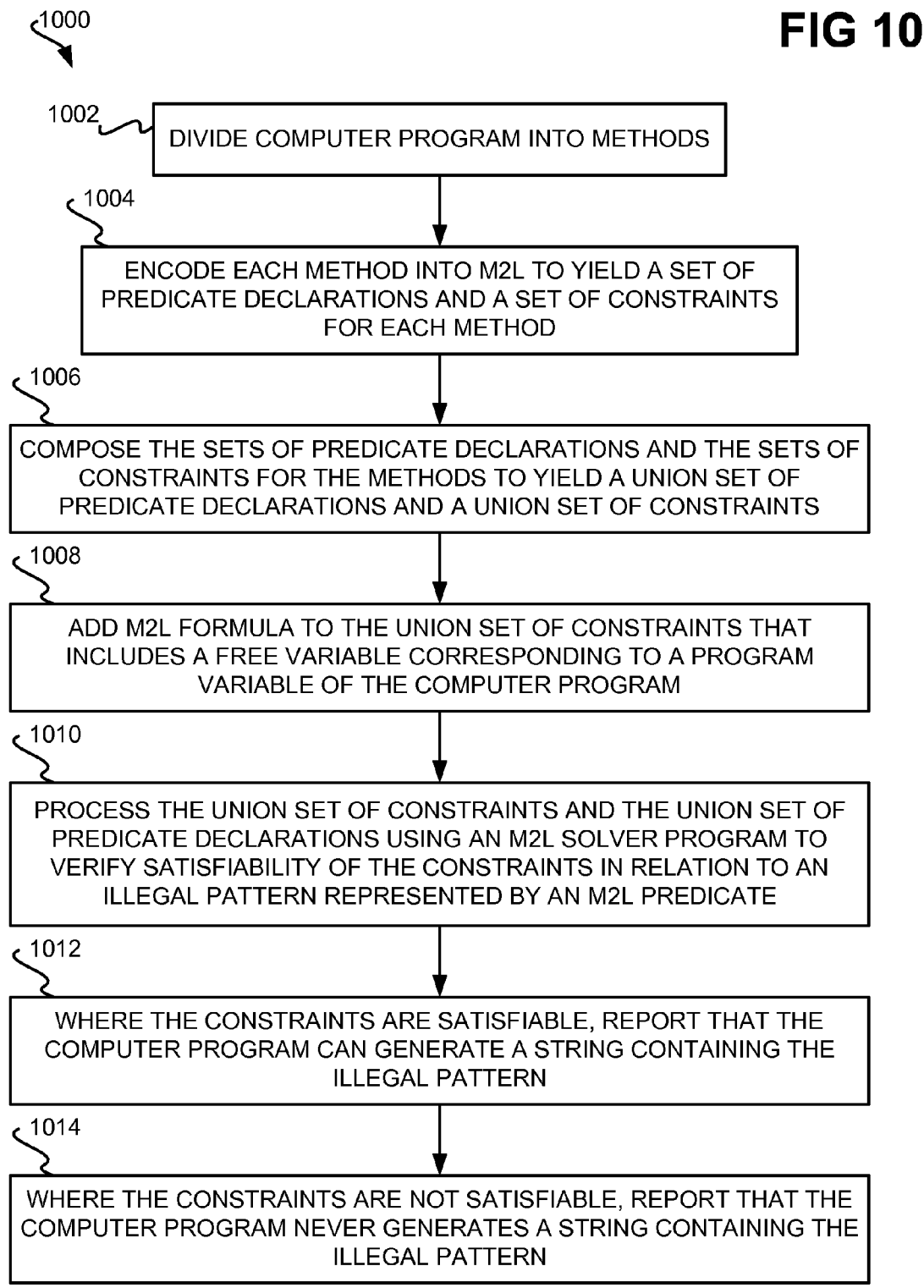

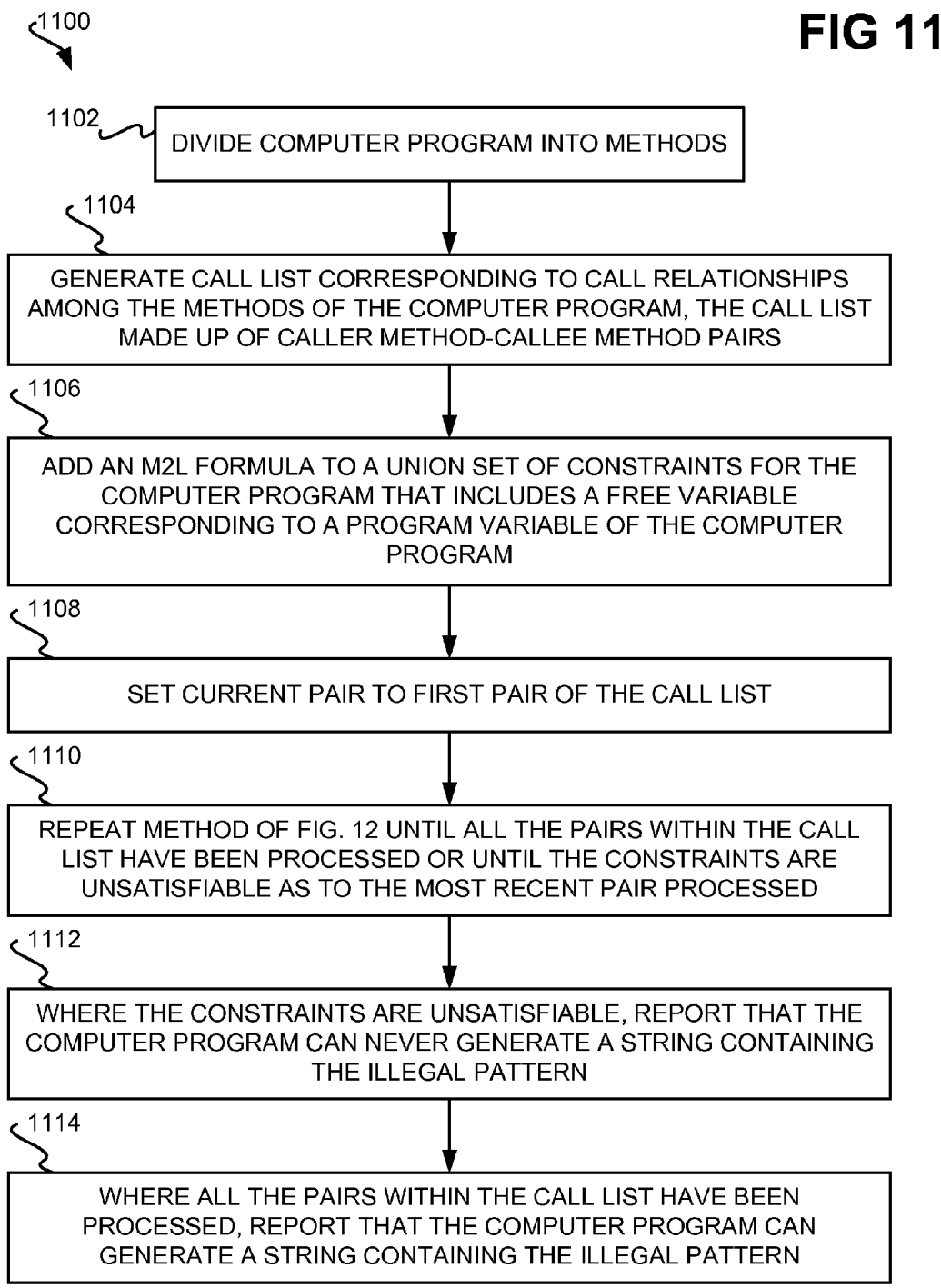

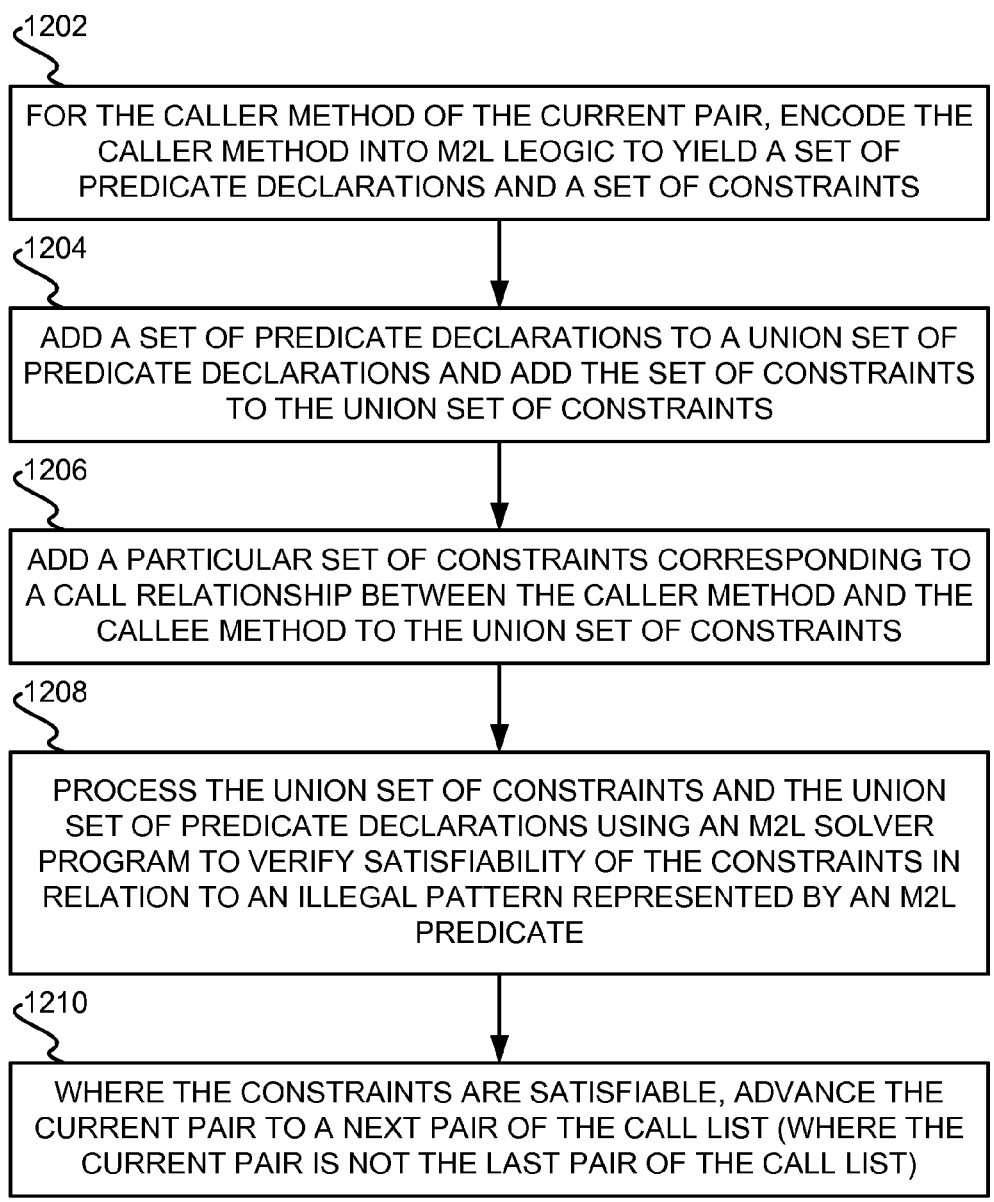

US 8,381,199 B2

MODULAR AND/OR DEMAND-DRIVEN STRING ANALYSIS OF A COMPUTER PROGRAM

BACKGROUND

String analysis is a technique for statically analyzing computer programs to infer which strings of characters arise within the computer programs at run-time. For example, FIG. 1 shows a computer program 100 written in the Java programming language that replaces the character "<" with the character "X". Therefore, as such, strings returned by the method main of the computer program 100 never should contain "<". String analysis techniques can verify this outcome.

SUMMARY OF THE INVENTION

A method of an embodiment of the invention is for performing modular string analysis of a computer program. The computer program is divided into methods. Each method is encoded into monadic second-order logic (M2L) to yield a set of predicate declarations and a set of constraints for the method. The sets of predicate declarations and the sets of constraints for the methods of the computer program are composed to yield a union set of predicate declarations and a union set of constraints for the computer program. The union set of constraints includes a particular set of constraints corresponding to call relationships among the methods of the computer program.

An M2L formula is added to the union set of constraints. The M2L formula including a free variable corresponding to a program variable of the computer program. The method of this embodiment processes the constraints within the union set of constraints and the predicate declarations within the union set of predicate declarations using an M2L solver program to verify a satisfiability of the constraints in relation to an illegal pattern represented by an M2L predicate. Where the constraints are satisfiable, the method of this embodiment reports that the computer program can generate a string containing the illegal pattern. Where the constraints are not satisfiable, the method reports that the computer program never generates a string containing the illegal pattern.

A method of another embodiment of the invention is for performing modular and demand-driven, iterative string analysis of a computer program. Both the method of this embodiment and the method of the prior embodiment can be implemented as computer-executable code stored on a non-transitory computer-readable data storage medium and executed by a processor, where such execution results in the method in question being performed. The method of this embodiment divides the computer program into methods, which are not to be confused with the method that performed the division. The method of this embodiment generates a call list corresponding to call relationships among the methods of the computer program. The call list includes a number of pairs, where each pair includes a caller method and a callee method. The method of this embodiment adds an M2L formula to a union set of constraints for the computer program, where the M2L formula include a free variable corresponding to a program variable of the computer program.

The method of this embodiment sets a current pair to a first pair of the call list, and repeats the following for the current pair. For the caller method of the current pair, the caller method is encoded into M2L to yield a set of predicate declarations and a set of constraints for the caller method. The set of predicate declarations are added to a union set of predicate declarations for the computer program and the set of constraints are added to the union set of constraints. A particular set of constraints corresponding to a call relationship between the caller method and the callee method of the current pair is further added to the union set of constraints. The constraints within the union set of constraints and the predicate declarations within the union set of predicate declarations are processed using an M2L solver program to verify a satisfiability of the constraints in relation to an illegal pattern represented by an M2L predicate. Where the constraints are satisfiable, the current pair is advanced to a next pair of the call list by the processor where the current pair is not currently a last pair of the call list.

The above part of the method of this embodiment is repeated until all the pairs within the call list have been processed or until the constraints are unsatisfiable. Where the constraints are unsatisfiable, the method of this embodiment reports that the computer program never generates a string containing the illegal pattern. Where all the pairs within the call list have been processed, the method of this embodiment reports that the computer program can generate a string containing the illegal pattern.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of an example computer program in relation to which string analysis can be performed.

FIG. 2 is a diagram of the computer program of FIG. 1 encoded into monadic second-order logic (M2L).

FIG. 3 is a diagram of the allowable instructions of a computer program translated into static single assignment (SSA) form, according to an embodiment of the invention.

FIG. 4 is a diagram of the defined syntax of M2L in relation to a string, according to an embodiment of the invention.

FIG. 5 is a diagram of the utility predicate declarations that can be used in encoding a computer program into M2L, according to an embodiment of the invention.

FIG. 6 is a flowchart of a method for encoding a method of a computer program into M2L, according to an embodiment of the invention.

FIG. 7 is a diagram of a definition of an extraction predicate, according to an embodiment of the invention.

FIG. 8 is a diagram of a definition of a sequence representation to which the extraction predicate of FIG. 7 corresponds, according to an embodiment of the invention.

FIG. 9 is a flowchart of a method for generating a particular set of constraints corresponding to a call relationship of a caller method to a second caller method of a computer program, according to an embodiment of the invention.

FIG. 10 is a flowchart of a method for performing modular string analysis of a computer program, according to an embodiment of the invention.

FIG. 11 is a flowchart of a method for performing modular and demand-driven, iterative string analysis of a computer program, according to an embodiment of the invention.

FIG. 12 is a flowchart of a method that is iteratively performed as part of the method of FIG. 11, according to an embodiment of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, string analysis is a technique for statically analyzing computer programs to infer which strings of characters arise within the computer programs at run-time. One type of string analysis, described in the patent application entitled "SYSTEM, METHOD, AND PROGRAM FOR DETERMINING VALIDITY OF STRING" filed on Jun. 29, 2010, and assigned Ser. No. 12/825,610 encodes a computer program into monadic second-order logic (M2L). For instance, FIG. 2 shows an M2L representation 200 of the computer program 100 of FIG. 1 that can be generated. For mathematical and logical expressions, this M2L representation 200 uses the notation provided by the MONA M2L solver computer program available at the Internet web site http: //www.brics.dk/mona/, which is maintained by the Department of Computer Science of Aarhus University, which is located in Aarhus, Denmark. For abstractions of built-in functions, this M2L representation 200 uses the notation [|func|].

As depicted in FIG. 2, each predicate prog_x corresponds to a program variable x and represents a property of strings assigned to the program variable, where v1then and v1else correspond to the program variable v1 used in the then block and the else block, respectively. The declaration of the predicate prog_v3 uses the predicate prog_v1then, and the declaration of the predicate_v2 uses the predicate prog_v4. Therefore, the string analysis technique described in the aforementioned patent application cannot encode the method main separately from the method delTag, and vice-versa.

By comparison, embodiments of the present invention provide for a modular and/or demand-drive string analysis technique, building upon the prior patent application. The string analysis technique is modular in that the satisfiability of constraints is verified just in relation to a given illegal (string) pattern to be detected within the computer program. The technique is demand-driven and iterative in that the satisfiability of the constraints in relation to this illegal pattern is verified on a method-by-method basis, and that the verification process can be terminated and subsequently resumed at any time.

In embodiments of the invention, therefore, methods of a computer program can be encoded separately. This can be achieved by using position set variables that represent a sequence of string properties. For example, the predicate prog_v3 can be defined as prog_v3(S)=[FV_v3](S), where FV_v3 is a free position set variable that represents the sequence of strings assigned to the program variable v3, and [FV_v3](S) states that the sequence contains a string represented by S. For instance, assuming that "a" or "b" is assigned to the program variable v3, FV_v3 represents the regular expression "([ab];)+", where ";" is a separator symbol. As such, [FV_3](S) states that the position set variable S represents a string "a" or "b".

An advantage of this approach is that constraining the position set variable FV_v3 can be delayed until the definition of the program variable v3 is obtained. As such, the string analysis is modularized. Furthermore, the input parameters of a method can be constrained by providing a specification of the strings returned by the method. This input reference is then iterated to verify that there exists an input string that makes the method return a string that satisfies the property. If there are no such input strings, it can be concluded that the property or specification does not hold, and that otherwise the property or specification may hold.

It is assumed that a computer program subject to the string analysis technique of embodiments of the invention can be translated into static single assignment (SSA) form. An SSA-translated computer program includes numbered basic blocks, where each includes various instructions. FIG. 3 shows the allowable instructions 300 of an SSA-translated computer program, according to an embodiment of the invention.

FIG. 4 shows the defined syntax 400 of M2L(Str), according to an embodiment of the invention. In FIG. 4, Var1 denotes a set of position variables and Var2 denotes a set of position-set variables. The formula 'a'(t) holds if $a_i$ in finite string $w=a_0 \ldots a_{n-1}$ is "a," where i is the interpretation of t in that i is the result of computing the numerical expression t. Constants 0 and $ represent the first and last positions in a string, respectively. The addition t+i of position-term t and natural number i is interpreted as t+i=j+i mod n, where j is the interpretation of t, and n is the length of string w. T+i, where T is a position-set term, results in position set {t+i|t in T}. The values t−i and T−i are interpreted similarly.

FIG. 5 shows the utility predicates 500 that can be used in encoding a computer program into M2L, according to an embodiment of the invention. The formula "a"(P) denotes that string "a" is represented by the position-set variable P. Furthermore, concat(R, P, Q) means that the string represented by R is obtained by concatenating the strings represented by P and Q; strr(R, P, p, q) indicates that R is the substring of P containing all the characters in the range [p,q); and, substrr(R, P, p, q) is similar to strr, where the difference is that R may be any substring. In addition, min(P) and max(P) return the minimum and maximum positions in P, respectively, and the predicate consecutive(p,q,R) denotes that positions p and q are consecutive in position set R. This predicate is used to denote the Kleene closure of a regular language.

It is finally noted that the notation provided by the MONA M2L solver computer program is sometimes used herein to denote mathematical expressions and logical expressions. For example, "|" can represent logical OR. As another example, "&" can represent logical AND.

FIG. 6 shows a method 600 for encoding a method m into M2L, according to an embodiment of the invention. The result of the method 600 is in the form (S, C), where S is a set of predicate declarations and C is a set of constraints expressed as M2L formulas. The method 600 begins by initializing the empty set S of predicate declarations and the empty set C of constraints (602).

For each instruction of the method m, the method 600 performs the following (604). The instruction is translated to a predicate declaration based on a basic encoding rule (606), such as in one embodiment as is described in the aforementioned patent application. The predicate declaration has the form "prog_v(S)=(M2L formula)". The predicate declaration is then added to the set S of predicate declarations (608).

For each call v=f(v1, . . . , vn) to a user-defined function f within the method m, the method 600 performs the following (610). A predicate declaration corresponding to the call is added to the set S of predicate declarations (612). The predicate declaration includes a free variable corresponding to a return variable of the function. Specifically, the predication declaration is of the form "prog_v(S)=[FV_f](S)", where FV_f is a free variable corresponding to the return variable of the function f, and [FV_ret](S) is an extraction predicate for the return variable. FIG. 7 shows a definition of an extraction predicate 700, according to an embodiment of the invention.

Next, M2L formulas are added to the set C of constraints (614). The M2L formulas include free variables corresponding to variables of the computer program of which the method m is a part. Specifically, the M2L formulas are of the form "[[pred_v]](FV_v1)", ..., "[[pred_vn]](FV_vn)", where FV_v1, ..., FV_vn are free variables corresponding to the program variables v1, ..., vn, respectively, and the notation [[pred_x]](FV_x) is a sequence representation for each program variable x. FIG. 8 shows a definition of a sequence representation 800, to which the predicate 700 of FIG. 7 corresponds, according to an embodiment of the invention.

The method 600 also adds, for each undefined program variable within the method m a predicate declaration corresponding to the undefined program variable to the set S of predicate declarations (616). The predication declaration includes a free variable corresponding to the undefined program variable. Specifically, for each undefined program variable v, a predicate "pred_v(S)=[FV_v](S)" is added to the set S, where FV_v is a free variable corresponding to the program variable v, and [FV_v](S) is an extraction predicate, of which the extraction predicate of FIG. 7 is also an example.

Finally, the method 600 adds for the return variable of the method m an M2L formula to the set C of constraints (618). Specifically, the M2L formula is "[[pred_ret]](FV_ret)". As such, the end result of the method 600 is the pair (S, C) of the set of predicate declarations and the set of constraints for the method m in relation to which the method 600 has been performed.

To compose the results (S1, C1), (S2, C2), ..., (Sn, Cn) that are obtained by encoding the methods m1, m2, ..., mn of a computer program via the method 600 of FIG. 6, the union of these results is created to yield a union set of predicate declarations and a union set of constraints for the computer program. That is, (S1+S2+ ... +Sn, C1+C2+ ... +Cn+C'), where "+" is the union operator. It is noted that the union set of constraints also includes C', which is a particular set of constraints corresponding to the call relationships among the methods of the computer programs.

FIG. 9 shows a method 900 for generating the particular set C' of constraints corresponding to a call relationship of a first or caller method mX to a second or callee method mY, according to an embodiment of the invention. It is noted that the method mX calls the method mY at least one time, and potentially more than one time. As such, the following is performed for each time the method mX calls the method mY (902)—that is, for each call from the method mX to the method mY.

First, an M2L formula that equates a free variable of the caller method to a free variable of the callee method is added to the particular set C' of constraints (904). That is, for every call instruction w=mY(v1, ..., vn) in the method mX, where program variables v1, ..., vn are those defined in the method mX, the M2L formula "FV_pZ=FV_vZ" is added to the particular set C' of constraints, where program variables p1, ..., pn are parameters of the method mY. Second, an M2L formula that equates a free variable corresponding to the time the caller method calls the callee method to a return variable of the callee method is added to the particular set C' of constraints (906). That is, the M2L formula "FV_w=FV_ret" is added to the particular set C' of constraints, where FV_ret is a free variable corresponding to the return variable ret of the method mY.

FIG. 10 shows a method 1000 for performing modular string analysis of a computer program, according to an embodiment of the invention. As with other methods of embodiments of the invention, the method 100 can be performed by a processor of a computing device like a computer. The method 1000 divides a computer program Prog into its methods m1, ..., mN (1002).

For each method mX, the method 1000 encodes the method mX into M2L to yield a set S of predicate declarations and a set C of constraints for the method mX (1004). For instance, the method 1000 can performed the method 600 of FIG. 6 for each method mX. Next, the method 1000 composes the sets of predicate declarations and the sets of constraints for the methods m1, ..., mN of the computer program Prog, to yield a union set of predicate declarations and a union set of constraints (1006), as has been described above. Specifically, the method 1000, in part 1006, performs the method 900 of FIG. 9 for each call from each method mX to every other method mY. As such, the union set of constraints includes the particular set C' of constraints corresponding to call relationships among the methods m1, ..., mN of the computer program Prog, as has been described above.

The method 1000 then adds an M2L formula to the union set of constraints (1008), where this M2L formula includes a free variable corresponding to a program variable of the computer program. Specifically, the M2L formula "ex2 S.[FV_var](S) & Pattern(S) is added to the set C. In this formula, FV_var is a free variable corresponding to the program variable var, and Pattern(S) is an M2L predicate representing an illegal pattern to be searched for in the method 1000.

The method 1000 then uses an M2L solver program, such as the MONA M2L solver program noted above, to process the union set of constraints and the union set of predicate declarations (1010). This processing is performed to verify the satisfiability of the constraints in relation to the illegal pattern represented by the M2L predicate Pattern(S). It is noted that if the constraints are satisfiable, then this means that the computer program Prog can generate the illegal pattern in question, whereas if the constraints are not satisfiable, then this means that the computer program Prog never generates the illegal pattern in question.

Therefore, where the constraints are satisfiable, the method 1000 reports that the computer program can generate a string containing the illegal pattern (1012). By comparison, where the constraints are not satisfiable, the method 1000 reports that the computer program never generates a string containing the illegal pattern (1014). For instance, the reporting may be achieved through a graphical user interface of the computing device having the processor that performed the method 1000.

The method 1000 of FIG. 10 is modular, in that each desired illegal pattern can be tested separately. However, the method 1000 is not demand-driven. That is, the method 1000 is not iterative, and thus cannot be terminated and restarted as computing resources permit. By comparison, FIG. 11 shows a method 1100 for performing string analysis of a computer program in both a modular and demand-driven, iterative manner, according to an embodiment of the invention. As with the method 1000, the method 1100 beings by dividing a computer program Prog into its methods m1, ..., mN (1102).

The method 1100 generates a call list corresponding to the call relationships among the methods of the computer program Prog (1104). The call list is made up of a number of pairs. Each pair includes a caller method and a callee method, where the caller method calls the callee method at least one time within the computer program Prog. It is noted that the call list does not have to contain all the call relationships within the computer program Prog, however. Rather, the call list just has to contain those call relationships containing the methods that are desired to undergo string analysis to determine whether a given illegal pattern is contained within any of these methods. Furthermore, additional pairs may be added to the end of the call list after the method 1100 has started process the pairs in part 1110 below.

The method 1100, as with the method 1000, presumes that a union set of predicate declarations and that a union set of constraints will be created for the methods of the computer program Prog. These sets are initially empty sets. Thereafter, an M2L formula is added to the union set of constraints for the computer program (1106), where this M2L formula includes a free variable corresponding to a program variable of the computer program. Specifically, the formula "ex2 S.[FV_var](s) & Pattern(S)" is added to the union set of constraints.

A current pair is set to the first pair of the call list (1108), and the method 1100 repeats the method 1200 of FIG. 12 until all the pairs within the call list have been processed, or until the constraints are unsatisfiable as to the most recent pair processed in the method 1200 (1110). The method 1200 of FIG. 12, as is described in detail below, effectively tests the caller method of the current pair within the call list to determine whether the constraints are satisfiable as to this current pair. If the constraints are not satisfiable, then this means that the computer program Prog never generates a string containing the illegal pattern—specifically that the caller method of the current pair never generates such a string. As such, the method 1200 is immediately executed, and further processing of the computer program Prog stops, such that the method 1100 of FIG. 11 reports that the computer program never generates a string containing the illegal pattern (1112).

However, if the constraints are satisfiable as to the current pair within the call list, then the method 1200 of FIG. 12 continues with the next pair in the call list. Ultimately, if the method 1200 has iterated through all the pairs in the call list without locating a method that satisfies the constraints, then this means that the computer program Prog can generate a string containing the illegal pattern. As such, the method 1100 of FIG. 11 reports that the computer program can generate a string containing the illegal pattern (1114).

Turning now to FIG. 12, this figure shows the method 1200 that is repeated in part 1110 until all the pairs within the call list have been processed or until the constraints are unsatisfiable as to the most recent pair processed, according to an embodiment of the invention. For the caller method of the current pair, the caller method is encoded into M2L to yield a set S of predicate declarations and a set C of constraints (1202). Specifically, the method 1200, in part 1202, performs the method 600 of FIG. 6 that has been described.

The set S of predicate declarations is added to the union set of predicate declarations, and the set C of constraints is added to the union set of constraints (1204). A particular set C' of constraints corresponding to the call relationship between the caller method and the callee method is also added to the union set of constraints (1206). Specifically, the method 1200, in part 1206, performs the method 900 of FIG. 9 for the call from the caller method to the callee method.

The union set of constraints and the union set of predicate declarations are processed using an M2L solver program, such as the MONA M2L solver program noted above (1208). This processing is performed to verify the satisfiability of the constraints in relation to the illegal pattern represented by the M2L predicate Pattern(S). If the constraints are satisfiable (that is, if the illegal pattern is present), then the current pair is advanced to the next pair within the call list if the current pair is not the last pair of the call list (1210).

As noted above, the method 1200 is repeated for each pair within the call list until one of two conditions occurs. The first condition is that the constraints are unsatisfiable in relation to the caller method of the current pair. As such, repetition/iteration of the method 1200 immediately ceases, and it is known that the computer program Prog never generates a string containing the illegal pattern. The second condition is that all the pairs within the call list have been processed in relation to the method 1200. As such, it is known that the computer program Prog can generates a string containing the illegal pattern.

The method 1100 of FIG. 11 is demand-driven, in that it can be temporally stopped at any time and then subsequently resumed. Furthermore, because it is iterative, the method 1100 can have caller method-callee method pairs added to the call list even after the method 1200 of FIG. 12 has begun to be performed. In this way, too, the method 1100 is demand-driven, because as additional caller method-callee method pairs are desired to be added to the call list, they can be, even if the method 1200 of FIG. 12 has begun to be performed.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method for performing modular string analysis of a computer program, comprising:
   dividing the computer program into a plurality of methods, by a processor;
   for each method of the computer program, encoding the method into monadic second-order logic (M2L) by the processor to yield a set of predicate declarations and a set of constraints for the method;
   composing the sets of predicate declarations and the sets of constraints for the methods of the computer program by the processor to yield a union set of predicate declarations and a union set of constraints for the computer program, the union set of constraints including a particular set of constraints corresponding to call relationships among the methods of the computer program;
   adding an M2L formula to the union set of constraints, by the processor, the M2L formula including a free variable corresponding to a program variable of the computer program;
   processing the constraints within the union set of constraints and the predicate declarations within the union set of predicate declarations by the processor using an M2L solver program to verify a satisfiability of the constraints in relation to an illegal pattern represented by an M2L predicate;
   where the constraints are satisfiable, reporting by the processor that the computer program can generate a string containing the illegal pattern; and,
   where the constraints are not satisfiable, reporting by the processor that the computer program never generates a string containing the illegal pattern.

2. The method of claim 1, wherein the modular string analysis is modular in that satisfiability of the constraints in relation to just the illegal pattern is verified.

3. The method of claim 1, wherein encoding the method into the M2L comprises, for each instruction of a plurality of instructions of the method:
   translating the instruction to a predicate declaration based on an encoding rule;
   adding the predicate declaration to the set of predicate declarations for the method.

4. The method of claim 3, wherein encoding the method into the M2L further comprises, for each call to a function within the method:
adding a predicate declaration corresponding to the call to the set of predicate declarations for the method, the predicate declaration including a free variable corresponding to a return variable of the function;
adding a plurality of M2L formulas to the set of constraints for the method, the M2L formulas including free variables corresponding to variables of the computer program.

5. The method of claim 4, wherein encoding the method into the M2L further comprises, for each undefined program variable within the method:
adding a predicate declaration corresponding to the undefined program variable to the set of predicate declarations for the method, the predicate declaration including a free variable corresponding to the undefined program variable.

6. The method of claim 5, wherein encoding the method into the M2L further comprises:
for a return variable of the method, adding an M2L formula to the set of constraints for the method.

7. The method of claim 1, wherein composing the sets of predicate declarations and the sets of constraints comprises, for each call from a first method of the methods of the computer program to a second method of the methods of the computer program, where the first method calls the second method one or more times:
for each time of the one or more times the first method calls the second method,
adding a first M2L formula to the particular set of constraints corresponding to the call relationships among the methods, the first M2L formula equating a free variable of the first method to a free variable of the second method;
adding a second M2L formula to the particular set of constraints, the second M2L formula equating a free variable corresponding to the time the first method calls the second method to a return variable of the second method.

8. A method for performing modular and demand-driven, iterative string analysis of a computer program, comprising:
dividing the computer program into a plurality of methods, by a processor;
generating, by the processor, a call list corresponding to call relationships among the methods of the computer program, the call list comprising a plurality of pairs, each pair including a caller method and a callee method;
adding a monadic second-order logic (M2L) formula to a union set of constraints for the computer program, by the processor, the M2L formula including a free variable corresponding to a program variable of the computer program;
setting a current pair to a first pair of the call list;
repeating:
for the caller method of the current pair, encoding the caller method into M2L by the processor to yield a set of predicate declarations and a set of constraints for the caller method;
adding the set of predicate declarations to a union set of predicate declarations for the computer program and adding the set of constraints to the union set of constraints, by the processor;
adding a particular set of constraints corresponding to a call relationship between the caller method and the callee method of the current pair to the union set of constraints, by the processor;
processing the constraints within the union set of constraints and the predicate declarations within the union set of predicate declarations by the processor using an M2L solver program to verify a satisfiability of the constraints in relation to an illegal pattern represented by an M2L predicate;
where the constraints are satisfiable, advancing the current pair to a next pair of the call list by the processor where the current pair is not currently a last pair of the call list,
until all the pairs within the call list have been processed or until the constraints are unsatisfiable;
where the constraints are unsatisfiable, reporting by the processor that the computer program never generates a string containing the illegal pattern; and,
where all the pairs within the call list have been processed, reporting by the processor that the computer program can generate a string containing the illegal pattern.

9. The method of claim 8, wherein the modular and demand-driven, iterative string analysis is demand-driven and iterative in that the satisfiability of the constrains in relation to the illegal pattern is verified on a method-by-method basis within the computer program and in that the modular and demand-driven, iterative string analysis can be terminated and subsequently resumed at any time.

10. The method of claim 8, wherein the modular and demand-driven, iterative string analysis is modular in that satisfiability of the constraints in relation to just the illegal pattern is verified.

11. The method of claim 8, wherein encoding the caller method into the M2L comprises, for each instruction of a plurality of instructions of the caller method:
translating the instruction to a predicate declaration based on an encoding rule;
adding the predicate declaration to the set of predicate declarations for the caller method.

12. The method of claim 11, wherein encoding the caller method into the M2L further comprises, for each call to a function within the caller method:
adding a predicate declaration corresponding to the call to the set of predicate declarations for the caller method, the predicate declaration including a free variable corresponding to a return variable of the function;
adding a plurality of M2L formulas to the set of constraints for the caller method, the M2L formulas including free variables corresponding to variables of the computer program.

13. The method of claim 12, wherein encoding the caller method into the M2L further comprises, for each undefined program variable within the caller method:
adding a predicate declaration corresponding to the undefined program variable to the set of predicate declarations for the caller method, the predicate declaration including a free variable corresponding to the undefined program variable.

14. The method of claim 13, wherein encoding the caller method into the M2L further comprises:
for a return variable of the caller method, adding an M2L formula to the set of constraints for the caller method.

15. The method of claim 8, wherein adding the particular set of constraints corresponding to the call relationship between the caller method and the callee method of the current pair to the union set of constraints comprises, for each time of one or more times the caller method calls the callee method, adding a first M2L formula to the particular set of constraints corresponding to the call relationships among the methods, the first M2L formula equating a free variable of the caller method to a free variable of the callee method;

adding a second M2L formula to the particular set of constraints, the second M2L formula equating a free variable corresponding to the time the caller method calls the callee method to a return variable of the callee method.

16. A non-transitory computer-readable data storage medium storing computer-executable code executable by a processor to perform a method comprising:

dividing the computer program into a plurality of methods;

generating a call list corresponding to call relationships among the methods of the computer program, the call list comprising a plurality of pairs, each pair including a caller method and a callee method;

adding a monadic second-order logic (M2L) formula to a union set of constraints for the computer program, the M2L formula including a free variable corresponding to a program variable of the computer program;

setting a current pair to a first pair of the call list;

repeating:
  for the caller method of the current pair, encoding the caller method into M2L to yield a set of predicate declarations and a set of constraints for the caller method;
  adding the set of predicate declarations to a union set of predicate declarations for the computer program and adding the set of constraints to the union set of constraints;
  adding a particular set of constraints corresponding to a call relationship between the caller method and the callee method of the current pair to the union set of constraints;
  processing the constraints within the union set of constraints and the predicate declarations within the union set of predicate declarations using an M2L solver program to verify a satisfiability of the constraints in relation to an illegal pattern represented by an M2L predicate;
  where the constraints are satisfiable, advancing the current pair to a next pair of the call list, where the current pair is not currently a last pair of the call list,
until all the pairs within the call list have been processed or until the constraints are unsatisfiable;

where the constraints are unsatisfiable, reporting that the computer program never generates a string containing the illegal pattern; and, where all the pairs within the call list have been processed, reporting that the computer program can generate a string containing the illegal pattern.

17. The non-transitory computer-readable data storage medium of claim 16, wherein encoding the caller method into the M2L comprises, for each instruction of a plurality of instructions of the caller method:

translating the instruction to a predicate declaration based on an encoding rule;

adding the predicate declaration to the set of predicate declarations for the caller method.

18. The non-transitory computer-readable data storage medium of claim 17, wherein encoding the caller method into the M2L further comprises, for each call to a function within the caller method:

adding a predicate declaration corresponding to the call to the set of predicate declarations for the caller method, the predicate declaration including a free variable corresponding to a return variable of the function;

adding a plurality of M2L formulas to the set of constraints for the caller method, the M2L formulas including free variables corresponding to variables of the computer program.

19. The non-transitory computer-readable data storage medium of claim 18, wherein encoding the caller method into the M2L further comprises:

for each undefined program variable within the caller method,
  adding a predicate declaration corresponding to the undefined program variable to the set of predicate declarations for the caller method, the predicate declaration including a free variable corresponding to the undefined program variable;

for a return variable of the caller method, adding an M2L formula to the set of constraints for the caller method.

20. The non-transitory computer-readable data storage medium of claim 16, wherein adding the particular set of constraints corresponding to the call relationship between the caller method and the callee method of the current pair to the union set of constraints comprises, for each time of one or more times the caller method calls the callee method, adding a first M2L formula to the particular set of constraints corresponding to the call relationships among the methods, the first M2L formula equating a free variable of the caller method to a free variable of the callee method;

adding a second M2L formula to the particular set of constraints, the second M2L formula equating a free variable corresponding to the time the caller method calls the callee method to a return variable of the callee method.

* * * * *